(12) United States Patent
Francis et al.

(10) Patent No.: US 6,436,219 B1
(45) Date of Patent: Aug. 20, 2002

(54) POLYESTER FILM

(75) Inventors: John Francis, Cleveland; David Edward Higgins, North Yorkshire, both of (GB)

(73) Assignee: DuPont Teijin Films U.S. Limited Partner, Wilmington, DE (US)

( * ) Notice: Subject to any disclaimer, the term of this patent is extended or adjusted under 35 U.S.C. 154(b) by 0 days.

(21) Appl. No.: 09/242,248

(22) PCT Filed: Aug. 6, 1997

(86) PCT No.: PCT/GB97/02098
  § 371 (c)(1),
  (2), (4) Date: May 5, 2000

(87) PCT Pub. No.: WO98/07068
  PCT Pub. Date: Feb. 19, 1998

(30) Foreign Application Priority Data

Aug. 14, 1996 (GB) ................................................ 9617078

(51) Int. Cl.⁷ .......................... B32B 27/18; B32B 27/20; B32B 27/36; B32B 31/30
(52) U.S. Cl. .................. 156/244.11; 428/212; 428/323; 428/480; 264/173.16; 430/523; 430/531; 430/533
(58) Field of Search ................................ 428/212, 323, 428/480; 524/495, 496; 430/523, 531, 533

(56) References Cited

U.S. PATENT DOCUMENTS

| | | | |
|---|---|---|---|
| 3,790,653 A | * 2/1974 | Barkey et al. | 264/171 |
| 3,830,773 A | * 8/1974 | Barkey et al. | 260/40 R |
| 3,905,938 A | * 9/1975 | Barkey et al. | 260/40 R |
| 4,167,414 A | * 9/1979 | Morgan | 96/87 R |
| 4,379,871 A | * 4/1983 | Werle et al. | 523/331 |
| 4,603,073 A | * 7/1986 | Renalls et al. | 428/147 |

FOREIGN PATENT DOCUMENTS

| EP | 0 327 971 A2 * | 8/1989 |
|---|---|---|
| GB | A-838708 | 6/1960 |

OTHER PUBLICATIONS

"Opaque Receiver Supports" Research Disclosure, no. 183, Jul. 1979, pp. 273–273, XP002046190.*

Whelan, Tony., Polymer Technology Dictionary, Chapman & Hall, 1994, pp. 60–61.*

* cited by examiner

*Primary Examiner*—Vivian Chen

(57) ABSTRACT

A polyester film having an opaque first polyester layer having an optical density greater than 2.0 and a second white polyester layer, wherein the film is made by coextrusion. The opaque first layer preferably contains carbon black. The film is suitable for use as a base for a photographic sheet.

7 Claims, 1 Drawing Sheet

POLYESTER FILM

This invention relates to a polyester film, and in particular to an opaque polyester film which is suitable for use as a photographic film.

The development of instant photography has enabled the immediate production of a finished photograph. Instant photography has become a powerful media for both professional and amateur photographers alike. Instant photographs have been used in a wide range of applications, for example for identification purposes, such as passports, for industrial and business applications, and in medical and scientific fields.

In instant photography, two types of sheet are used, a photosensitive sheet, and an image-receiving or print sheet in which a positive image is formed. A reagent system is used which is released from a sealed pod, spreads to form a thin layer between the two sheets, and acts to produce both an image in the photosensitive layer(s) of the photosensitive sheet, and a final positive image in the image-receiving layer of the image-receiving sheet. A series of complementary positive and negative images may be formed, one or more of which can serve as a starting point for a transfer process resulting in the final positive image in the image-receiving layer.

There are two main types of instant photographic systems, known as peel-apart and integral type. In the peel-apart system, the photosensitive sheet and image-receiving sheet are laminated together as reagent is spread at the start of processing. The sheets are then peeled apart to terminate processing and enable viewing of the image. In the integral system, the photosensitive sheet and image-receiving sheet are permanently secured as a single unit. The image-receiving layers are located on the inner surfaces of the two sheets, at least one of which is transparent. The image is usually viewed through the transparent sheet against a reflective white pigment layer within the film unit.

In the peel-apart system, resin-coated paper has generally been used as the image-receiving sheet. The paper generally has a grey or black layer which prevents the unwanted transmission of light, and a white layer for reflecting the formed image. However, the natural fibre content of paper can result in the final image appearing grainy or of uneven colour distribution. Thus, there is a requirement for an image-receiving sheet having improved image quality. In addition, paper has relatively poor tensile properties, which means that relatively thick paper must be used, which limits the number of sheets which can be included in a single photographic film cassette for an instant camera.

Polyester film has been used in a wide range of photographic applications. White polyester film has been used for producing traditional photographic prints. Unfortunately, existing white polyester films are of relatively low opacity such that some light can pass through the film. The opacity of a film can be increased by increasing the concentration of the whitening or opacifying agent, ie filler, present in the film, or by increasing the thickness of the film. However, there are practical limits on how much filler can be incorporated into a film, and increasing film thickness will correspondingly increase the cost of the film and may make it unsuitable for the particular intended application.

We have now devised a polyester film which reduces or overcomes at least one of the aforementioned problems.

Accordingly, the present invention provides a polyester film comprising an opaque first layer having an optical density greater than 2.0, and a white second layer.

The invention also provides a method of producing a polyester film which comprises forming an opaque first layer having an optical density greater than 2.0, and applying on one surface thereof, a white second layer.

The invention further provides a use of a polyester film comprising an opaque first layer having an optical density greater than 2.0, and a white second layer, in instant photography.

The invention still further provides a photographic sheet comprising a polyester film comprising an opaque first layer having an optical density greater than 2.0, and a white second layer.

The opaque first layer and/or white second layer of a polyester film according to the invention may be formed from any film-forming polyester material, such as a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyidicarboxylic acid, hexahydro-terephthalic acid or 1,2-bis-p-carboxyphenoxyethane (optionally with a monocarboxylic acid, such as pivalic acid) with one or more glycols, particularly an aliphatic glycol, eg ethylene glycol, 1,3-propanediol, 1,4-butanediol, neopentyl glycol and 1,4-cyclohexanedimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range from 70 to 125° C., and preferably heat set, typically at a temperature in the range from 150 to 250° C., for example as described in GB-A-838,708.

In a preferred embodiment of the invention the opaque first layer and white second layer of the polyester film comprise the same polyester, more preferably polyethylene terephthalate or polyethylene naphthalate, and particularly polyethylene terephthalate. It is also preferred that the first layer and/or second layer comprise crystalline and/or semi-crystalline polyester material.

The opaque first layer and/or white second layer of a polyester film according to the invention may be uniaxially oriented, but are preferably biaxially oriented by drawing in two mutually perpendicular directions in the plane of the film to achieve a satisfactory combination of mechanical and physical properties. Formation of the film may be effected by any process known in the art for producing an oriented polyester film, for example a tubular or flat film process.

In a tubular process simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film, process a film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, ie the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is effected to an extent determined by the nature of the film-forming polyester, for example polyethylene terephthalate is usually stretched so that the dimension of the oriented film is from 2 to 5, more preferably 2.5 to 4.5 times its original dimension in the, or each direction of stretching.

A stretched film may be, and preferably is, dimensionally stabilised by heat-setting under dimensional restraint at a temperature above the glass transition temperature of the film-forming polyester but below the melting temperature thereof, to induce crystallisation of the polyester.

Formation of a polyester film according to the invention may be effected by conventional techniques, for example by laminating together a preformed opaque first layer, and a preformed white second layer, or by casting the first layer onto a preformed second layer, or vice versa. Conveniently, however, formation of a composite polyester film according to the present invention is effected by coextrusion, preferably of the two layers (first/second), either by simultaneous coextrusion of the respective film-forming layers through independent orifices of a multi-orifice die, and thereafter uniting the still molten layers, or, preferably, by single-channel coextrusion in which molten streams of the respective polyesters are first united within a channel leading to a die manifold, and thereafter extruded together from the die orifice under conditions of streamline flow without intermixing thereby to produce a composite polyester film.

The first layer is opaque, by which is meant exhibits a Transmission Optical Density (TOD), measured as described herein, of greater than 2.0, preferably in the range from 2.5 to 10, more preferably 3.0 to 7.0, particularly 3.5 to 6.0, and especially 4.5 to 5.5. The aforementioned TOD ranges are particularly applicable to a 20 μm thick first layer. The first layer is conveniently rendered opaque by the incorporation therein of an effective amount of an opacifying agent, such as carbon black, or a metallic filler such as aluminium powder. Carbon black is a particularly preferred opacifying agent, especially carbon black known as Furnace type carbon black.

The opaque first layer preferably comprises in the range from 0.05% to 10%, more preferably 1% to 7%, particularly 2% to 6%, and especially 3% to 5% of opacifying agent, by weight based on the weight of the first layer polyester. The opacifying agent, preferably of carbon black, suitably has a mean particle diameter in the range from 0.005 to 10 μm, more preferably 0.01 to 1.5 μm, especially 0.015 to 0.1 μm, and particularly 0.02 to 0.05 μm.

The opacifying agent preferably has a BET surface area, measured as described herein, in the range from 20 to 300, more preferably 50 to 200, and particularly 110 to 160 $m^2 gm^{-1}$.

The opaque first layer is suitably grey, or preferably black, the external surface thereof more preferably exhibiting a CIE laboratory colour co-ordinate L* value in the range from 10 to 60, more preferably 15 to 50, particularly 20 to 40, and especially 25 to 35.

In a one embodiment of the invention, the opaque first layer additionally comprises at least one whitening agent, as described below. It is preferred that the opaque first layer comprises the same whitening agent(s) present in the white outer layer, ie the opaque first layer and white second layer preferably comprise at least one, more preferably barium sulphate, common whitening agent. The first layer preferably comprises in the range from 5% to 95%, more preferably 10% to 70%, particularly 20% to 50%, and especially 25% to 35% by weight of whitening agent, preferably barium sulphate, relative to the weight of the same whitening agent present in the second layer.

The thickness of the opaque first layer is preferably in the range from 5 to 150 μm, more preferably 10 to 100 μm, particularly 12 to 50 μm, and especially 14 to 25 μm.

The white second layer preferably exhibits a Transmission Optical Density (TOD) in the range from 0.4 to 1.75, more preferably 0.6 to 1.3, particularly 0.7 to 1.1, and especially 0.8 to 1.0. The aforementioned TOD ranges are particularly applicable to a 60 μm thick second layer. The second layer is conveniently rendered white by incorporation therein of an effective amount of a whitening agent. Suitable whitening agents include a particulate inorganic filler, an incompatible resin filler, or a mixture of two or more such fillers.

Particulate inorganic fillers suitable for generating a white second layer include conventional inorganic pigments and fillers, and particularly metal or metalloid oxides, such as alumina, silica and titania, and alkaline metal salts, such as the carbonates and sulphates of calcium and barium. Suitable inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the second layer polymer.

Suitable particulate inorganic fillers may be of the non-voiding or voiding type, ie by voiding is meant comprises a cellular structure containing at least a proportion of discrete, closed cells. Barium sulphate is an example of a filler which results in the formation of voids. Titanium dioxide may be of the voiding or non-voiding type, dependant upon the particular type of titanium dioxide employed. In a preferred embodiment of the invention, the white second layer comprises titanium dioxide or barium sulphate, and particularly a mixture thereof.

The amount of inorganic filler incorporated into the white second layer desirably should be not less than 5% nor exceed 60% by weight, based on the weight of the second layer polyester. Particularly satisfactory levels of whiteness are achieved when the concentration of filler is preferably in the range from 10% to 55%, more preferably 15% to 50%, particularly 20% to 45%, and especially 25% to 35% by weight, based on the weight of the second layer polyester. In a particularly preferred embodiment of the invention, the second layer comprises a mixture of titanium dioxide and barium sulphate particles, preferably present in a weight ratio in the range from 3 to 0.3:1, more preferably 2 to 0.5:1, particularly 1.5 to 0.7:1, and especially 1.1 to 0.9:1.

The titanium dioxide filler particles may be of anatase or rutile crystal form. The titanium dioxide particles preferably comprise a major portion of anatase, more preferably at least 60% by weight, particularly at least 80%, and especially approximately 100% by weight of anatase. The particles can be prepared by standard procedures, such as using the chloride process, or preferably by the sulphate process.

In one embodiment of the invention the titanium dioxide particles are coated preferably with inorganic oxides such as aluminium, silicon, zinc, magnesium or mixtures thereof. Preferably the coating additionally comprises an organic compound, such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds.

The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate.

The individual or primary titanium dioxide particles suitably have a mean crystal size, as determined by electron microscopy, in the range from 0.05 to 0.4 µm, preferably 0.1 to 0.3 µm, and more preferably 0.2 to 0.25 µm. In a preferred embodiment of the invention, the primary titanium dioxide particles aggregate to form clusters or agglomerates comprising a plurality of titanium dioxide particles. The aggregation process of the primary titanium dioxide particles may take place during the actual synthesis of the titanium dioxide and/or during the polyester and/or polyester film making process.

The inorganic filler, suitably aggregated titanium dioxide and/or barium sulphate, preferably has a volume distributed median particle diameter (equivalent spherical diameter corresponding to 50% of the volume of all the particles, read on the cumulative distribution curve relating volume % to the diameter of the particles—often referred to as the "D(v, 0.5)" value) in the range from 0.1 to 1.5 µm, more preferably 0.2 to 1.2 µm, particularly 0.4 to 1.0 µm, and especially 0.6 to 0.9 µm.

It is preferred that none of the filler particles incorporated into the white second layer according to this invention should have an actual particle size exceeding 20 µm. Particles exceeding such a size may be removed by sieving processes which are known in the art. However, sieving operations are not always totally successful in eliminating all particles greater than a chosen size. In practice, therefore, the size of 99.9% by number of the particles should not exceed 20 µm. Most preferably the size of 99.9% of the particles should not exceed 10 µm. Preferably at least 90%, more preferably at least 95% of the filler particles, are within the range of the volume distributed median particle diameter ±0.5 µm, and particularly ±0.3 µm.

Particle size of the filler particles described herein may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile. The volume distributed median particle diameter of the filler particles is suitably measured using a Malvern Instruments Mastersizer MS 15 Particle Sizer after dispersing the filler in ethylene glycol in a high shear (eg Chemcoll) mixer.

By an "incompatible resin" is meant a resin which either does not melt, or which is substantially immiscible with the polyester, at the highest temperature encountered during extrusion and fabrication of the white second layer. Such resins include polyamides and olefin polymers, particularly a homo- or co-polymer of a mono-alpha-olefin containing up to 6 carbon atoms in its molecule, for incorporation into polyester films. Preferred materials, particularly for incorporation into a polyethylene terephthalate second layer, include an olefin polymer, such as a low or high density homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Dispersibility of the aforementioned olefin polymer in a white second layer may be inadequate to confer the desired characteristics. Preferably, therefore a dispersing agent is incorporated together with the olefin polymer softening agent. The dispersing agent conveniently comprises a carboxylated polyolefin, particularly a carboxylated polyethylene. Suitable carboxylated polyolefins include those having a Brookfield Viscosity (140° C.) in the range 150–100000 cps (preferably 150–50000 cps) and an Acid Number in the range 5–200 mg KOH/g (preferably 5–50 mg KOH/g), the Acid Number being the number of mg of KOH required to neutralise 1 g of polymer.

The amount of dispersing agent may be selected to provide the required degree of dispersibility, but conveniently is in the range from 0.05% to 50%, preferably 0.5% to 20% by weight, based on the weight of the olefin polymer.

The amount of incompatible resin filler present in the white second layer is preferably in the range from 2% to 30%, more preferably 3% to 20%, particularly 4% to 15%, and especially 5% to 10% by weight, based on the weight of the second layer polyester.

In one embodiment of the invention, the white second layer comprises an optical brightener. An optical brightener may be included at any stage of the polymer or polymer film production. Preferably, the optical brightener is added to the glycol, or alternatively by subsequent addition to the polyester prior to the formation of the polyester film, eg by injection during extrusion. The optical brightener is preferably added in amounts in the range from 50 to 1500 ppm, more preferably 100 to 1000 ppm, particularly 200 to 600 ppm, and especially 250 to 350 ppm by weight, relative to the weight of the second layer polyester. Suitable optical brighteners include those available commercially under the trade names "Uvitex" MES, "Uvitex" OB, "Leucopur" EGM and "Eastobrite"OB-1.

The components of the opaque first layer and/or white second layer compositions may be mixed together in conventional manner. For example, by mixing with the monomeric reactants from which the polyester is derived, or the components may be mixed with the polyester by tumble or dry blending or by compounding in an extruder, followed by cooling and, usually, comminution into granules or chips. Alternatively, masterbatching technology may be employed.

A polyester film according to the invention preferably exhibits a Deformation Index (DI) of greater than 2.5%, and more preferably not greater than 50%. The polyester film preferably exhibits a DI within the range from 3.5% to 20%, particularly 4.0% to 10%, and especially 5% to 7%. The DI is expressed as a percentage of the original thickness of the film, observed when the film is subjected, at a temperature of 200° C., to a pressure of 2 megaPascals applied normal to the plane of the film sheet by the test procedure described herein. A polyester film having a DI within the aforementioned preferred ranges, is particularly suitable for embossing.

The external surface of the white second layer preferably exhibits an 85° gloss value, measured using a Dr Lange Reflectometer REFO 3 according to DIN 67530, in the range from 40% to 70%, more preferably 45% to 65%, particularly 50% to 60%, and especially 52% to 57%.

The external surface of the white second layer preferably exhibits a root mean square surface roughness (Rq), measured using a Wyko Optical Profiler over a field of view of 0.9×1.2 mm, in the range from 100 to 1000 nm, more preferably 120 to 700 nm, particularly 130 to 600 nm, and especially 150 to 500 nm.

The external surface of the white second layer preferably has the following CIE laboratory colour co-ordinate values for L*, a* and b*, measured as herein described. The L* value is suitably greater than 85, preferably in the range from 90 to 100, more preferably 93 to 99, and particularly 95 to 98. The a* value is preferably in the range from −2 to 3, more preferably −1 to 2, particularly 0 to 1.5, and especially 0.3 to 0.9. The b* value is preferably in the range from −10 to 0, more preferably −10 to −3, particularly −9 to −5, and especially −8 to −7.

The colour co-ordinate values may be modified by the incorporation of suitable dyes, such as a blue and/or magenta dye(s), into the film-forming polyester of the white second layer. For example a blue dye may be used, preferably at a concentration in the range from 10 to 1000 ppm, more preferably 30 to 500 ppm, particularly 50 to 200 ppm, and especially 100 to 150 ppm, relative to the weight of the second layer polyester. Alternatively, or in addition, a magenta dye may be employed, preferably at a concentration in the range from 2 to 200 ppm, more preferably 4 to 100 ppm, particularly 7 to 50 ppm, and especially 10 to 15 ppm, relative to the weight of the second layer polyester.

The external surface of the white second layer preferably exhibits a whiteness index, measured as herein described, in the range from 80 to 120, more preferably 85 to 110, particularly 90 to 105, and especially 95 to 100 units.

The polyester film preferably exhibits a Transmission Optical Density (TOD), in the range from 3.0 to 10, more preferably 3.5 to 8.0, particularly 4.0 to 7.0, and especially 5.0 to 6.0.

The thickness of the white second layer is preferably in the range from 10 to 200 $\mu$m, more preferably 20 to 150 $\mu$m, particularly 40 to 100 $\mu$m, and especially 50 to 70 $\mu$m.

The overall thickness of the polyester film according to the invention is preferably in the range from 15 to 350 $\mu$m, more preferably 30 to 250 $\mu$m, particularly 50 to 100 pm, and especially 70 to 90 $\mu$m. The thickness of the opaque first layer is preferably in the range from 5% to 60%, more preferably 5% to 40%, particularly 10% to 30%, and especially 15% to 25% of the thickness of the polyester film.

In a preferred embodiment, at least one external surface of a polyester film according to the invention, preferably the surface of the white second layer, is coated with an adherent or primer layer which improves the adhesion of subsequently applied layers. Suitable primer layer materials include film-forming polymeric resins such as acrylic resins, copolyesters, styrene copolymers, acrylic copolymers, functionalised polyolefins, polyvinyl alcohol, polyallylamine, cellulosic materials such as nitrocellulose, ethylcellulose and hydroxyethylcellulose. Blends or mixtures of any of the aforementioned polymeric resins may be employed.

A particularly preferred primer layer, comprises a homopolymer and/or copolymer comprising styrene and/or a styrene derivative. The styrene copolymer comprises at least one other ethylenically unsaturated comonomer which is copolymerisable with the styrene and/or styrene derivative. Styrene derivatives suitable for the production of the primer layer polymer preferably comprise chloro styrene, hydroxy styrene and alkylated styrenes, wherein the alkyl group contains from one to ten carbon atoms. Generally, the molar proportion of the styrene and/or styrene derivative monomer should preferably exceed 25 mole % of the copolymer.

It has been found that a satisfactory combination of properties may be obtained for copolymers derived from only two monomers when the styrene and/or styrene derivative is present in a preferred proportion within the range 60 to 90 mole %. Satisfactory properties are provided by terpolymers comprising styrene and/or a styrene derivative in the range 35 to 90 mole %.

Styrene derivative comonomers may be employed to provide special copolymer properties. For example sulphonated styrene derivatives provide anti-static properties. Such copolymers may comprise other non-sulphonated styrene and/or styrene derivatives within the effective range specified above.

Copolymers of styrene and/or styrene derivatives may comprise one or more other ethylenically unsaturated comonomers which are copolymerisable therewith. Suitable comonomers may be selected from unsaturated carboxylic acids, such as acrylic and methacrylic acids and their esters and amides, including alkyl esters in which the alkyl group contains up to ten carbon atoms eg methyl, ethyl, propyl, isopropyl, butyl, hexyl, heptyl, n-octyl and 2-ethylhexyl groups, butadiene, acrylonitrile, vinyl esters, such as vinyl acetate, vinyl chloroacetate, vinyl benzoate, vinyl pyridine and vinyl cnloride, vinylidene chloride, maleic acid and anhydride and itaconic acid and anhydride. The preferred copolymers may be formed with butadiene, butyl acrylate and/or itaconic acid. Copolymers comprising at least 50, preferably 60 mole % of styrene are especially useful.

Conventional additives may be included in the primer layer, eg adhesion promoters, such as a partially hydrolysed vinyl acetate/vinyl chloride copolymer optionally admixed with a chlorinated phenol, slip and anti-static agents.

The primer layer may be applied by conventional techniques as a dispersion or solution in a suitable solvent. If desired, the primer layer dispersion or solution may contain a cross-linking agent which functions to cross-link the primer layer polymer thereby improving adhesion to the surface of the polyester film. Additionally, the cross-linking agent should preferably be capable of internal cross-linking in order to provide protection against solvent penetration. Suitable cross-linking components may comprise epoxy resins, alkyd resins, amine derivatives such as hexamethoxymethyl melamine, and/or condensation products of an amine, eg melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines with an aldehyde eg formaldehyde. A useful condensation product is that of melamine with formaldehyde. The condensation product may optionally be alkoxylated. The cross-linking agent may be used in amounts of up to 25% by weight, based on the weight of the polymer in the primer layer composition.

A catalyst is also preferably employed to facilitate cross-linking. Preferred catalysts for cross-linking melamine formaldehyde include ammonium chloride, ammonium nitrate, ammonium thiocyanate, ammonium dihydrogen phosphate, ammonium sulphate, diammonium hydrogen phosphate, para toluene sulphonic acid, maleic acid stabilised by reaction with a base, and morpholinium para toluene sulphonate.

The primer layer coating medium may be applied to an already oriented polyester film. However, application of the primer layer coating medium is preferably effected before or during any stretching operation employed.

In particular, it is preferred that the primer layer coating medium should be applied between the two stages (longitudinal and transverse) of a biaxial stretching operation. Such a sequence of stretching and coating is especially preferred for the production of a coated polyester film, which is preferably firstly stretched in the longitudinal direction over a series of rotating rollers, coated with the primer layer and then stretched transversely in a stenter oven, preferably followed by heat setting.

The procedure for applying the primer composition may be any of the known coating techniques, such as dip coating, bead coating, reverse roller coating or slot coating. The primer layer is preferably applied as an aqueous dispersion in such an operation.

Modification of the surface of the primer layer eg by flame treatment, ion bombardment, electron beam treatment or preferably by corona discharge, may improve the adhesion of subsequently applied layers but may not be essential to the provision of satisfactory adhesion.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface. The applied primer layer should preferably exhibit a wetting test value after corona discharge treatment exceeding 56 dynescm$^{-1}$ when measured by the Union Carbide Standard Wetting Test (WC 81-3/ 1964) with formamide/'Cellosolve' mixture, whereas the value exhibited by an untreated layer is generally in the range 34 to 38 dynescm$^{-1}$. In this test, liquid mixtures having a range of surface tensions are made up using various concentrates of formamide in 'Cellosolve' (2-ethoxy ethanol) and brushed onto the surface to be examined. The wetting test value is the surface tension of the liquid mixture having the highest surface tension which does not contract into droplets within two seconds after application onto the surface.

Primer layers having a coat weight in the range 0.1 to 10 mgdm$^{-2}$ provide satisfactory adhesion. Coat weights in the range 0.5 to 3.0 mgdm$^{-2}$ are preferred.

Prior to deposition of the primer layer onto the surface of the polyester film, the exposed surface thereof may, if desired, be subjected to a chemical or physical surface-modifying treatment to improve the bond between that surface and the subsequently applied subbing layer polymer. A preferred treatment, because of its simplicity and effectiveness, is to subject the exposed surface of the polyester film to a high voltage electrical stress accompanied by corona discharge. Alternatively, the surface of the polyester film may be pre-treated with an agent known in the art to have a solvent or swelling action on the polymer surface thereof. Examples of such agents, which are particularly suitable for the treatment of a polyester film, include a halogenated phenol dissolved in a common organic solvent eg a solution of p-chloro-m-cresol, 2,4-dichlorophenol, 2,4, 5- or 2,4,6-trichlorophenol or 4-chlororesorcinol in acetone or methanol.

The layers of a polyester film according to the invention may, if desired, contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated as appropriate.

The polyester film described herein is suitable for use as a component of a sheet for instant photography. The Encyclopaedia of Chemical Technology, Kirk-Othmer, Fourth Edition (1993), Volume 9, Pages 1003 to 1048 describe the basic principles of instant photography, and give examples of many types of structures for both peel-apart and integral instant photographic sheets. The polyester film according to the present invention may be used as a component in any of the sheet structures described in the aforementioned reference. In particular, the polyester film can be used as a base for an image-receiving sheet for peel-apart instant photography. The image-receiving sheet comprises an image-receiving layer which may be adhered either directly or indirectly to the surface of the white second layer, or to the surface of the primer layer on the white second layer. The image-receiving layer generally comprises a suitable polymeric material such as polyvinyl alcohol, and a mordant which functions to immobilise absorbed image dyes. A suitable mordant is poly(4-vinylpyridine). The image-receiving sheet may comprise one or more additional layers, such as a water barrier layer, an acid polymer layer, a timing layer, etc between the image-receiving layer and polymeric film according to the present invention. The composition and function of such additional layers are well known in the art.

The polyester film according to the present invention may also be used as a base for a photographic sheet having a photosensitive layer, such as a photosensitive sheet for peel-apart instant photography, or for a traditional photographic print. The photosensitive layer is usually a gelatinous silver halide emulsion layer. The composition of such photosensitive layers is well known in the art.

BRIEF DESCRIPTION OF DRAWINGS

The invention is illustrated by reference to the following drawings in which:

Referring to FIG. 1 of the drawings, the polyester film comprises an opaque first layer (1) having a white second layer (2) bonded to a first surface (3) of the first layer.

Figure 1:
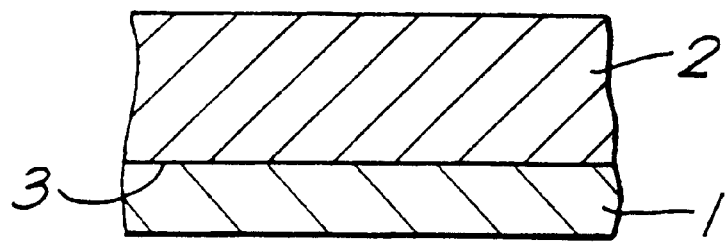
FIG. 1 is a schematic sectional elevation, not to scale, of a polyester film having an opaque first layer and a white second layer.
Figure 2:
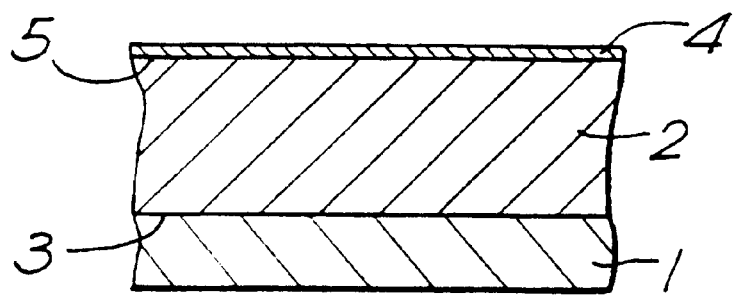
FIG. 2 is a similar schematic elevation of a film shown in FIG. 1, with a primer layer on the surface of the white second layer remote from the opaque first layer.

The film of FIG. 2 additionally comprises a primer layer (4) on the second surface (5) of the second layer (2).

Figure 3:
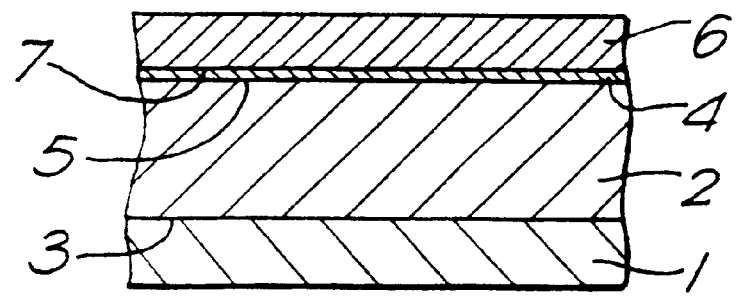
FIG. 3 is a similar schematic elevation of a film shown in FIG. 2, with an image-receiving layer on the surface of the primer layer.

The film of FIG. 3 additionally comprises an image-receiving layer (6) on the surface (7) of the primer layer (4).

In this specification the following test methods have been used to determine certain properties of the polyester film:

(i) Transmission Optical Density (TOD) of the film was measured using a Macbeth Densitometer TR 927 (obtained from Dent and Woods Ltd, Basingstoke, UK) in transmission mode.

(ii) L*, a* and b* colour co-ordinate values (CIE (1976)) and whfteness index of the 5 external surface of the white second layer were measured using a Colorgard System 2000, Model/45 (manufactured by Pacific Scientific) based on the principles described in ASTM D 313.

(iii) The deformation index (DI) was measured using a thermomechanical analyser, Perkin Elmer, type TMA7, with a test probe having a surface area of 0.785 mm$^2$. A sample of the polyester film was introduced in a sample holder into the TMA7 furnace and allowed to equilibrate at the selected temperature of 200° C. The probe was loaded to apply a pressure of 0.125 megaPascals normal to the planar surface of the hot film sample and the deformation observed to be zero. The load on the probe was then increased whereby a pressure of 2 megaPascals was applied to the sample. The observed displacement of the probe under the increased load was recorded and expressed as a percentage of the thickness of the undeformed hot sample (under 0.125 megaPascals pressure). The aforementioned percentage is the DI of the tested film. The procedure was repeated four times with different samples of the same film, and a mean value of the five measurements calculated.

The invention is further illustrated by reference to the following examples.

EXAMPLE 1

Separate streams of (i) a first layer polymer of polyethylene terephthalate comprising 4% by weight, relative to the weight of polyethylene terephthalate, of Furnace type carbon black having a mean particle diameter of 23 nm and BET specific surface area of 150 $m^2gm^{-1}$ (measured by multi-point nitrogen adsorption using a Micromeritics ASAP 2400 (Micromeritics Limited, Dunstable, UK)), and (ii) a second layer polymer of polyethylene terephthalate comprising 13% by weight, relative to the weight of polyethylene terephthalate, of anatase titanium dioxide having a volume distributed median particle diameter of 0.7 μm, 13% by weight, relative to the weight of polyethylene terephthalate, of barium sulphate having a volume distributed median particle diameter of 0.6 μm, and 100 ppm of a blue dye and 10 ppm of a magenta dye, were supplied from separate extruders to a single channel coextrusion assembly. The polymer layers were extruded through a film-forming die onto a water cooled rotating, quenching drum to yield an amorphous cast composite extrudate. The cast extrudate was heated to a temperature of about 80° C. and then stretched longitudinally at a forward draw ratio of 2.9:1. The film was passed into a stenter oven, where the film was dried and stretched in the sideways direction to approximately 3.4 times its original dimensions. The biaxially stretched polyester film was heat set at a temperature of about 220° C. Final film thickness was 80 μm. The opaque first layer was 16 μm thick, and the white second layer was 64 μm thick.

The polyester film was subjected to the test procedures described herein and exhibited the following properties:

(i) Transmission Optical Density (TOD)=5.4.

(ii) $L^*$=95.36. $a^*$=1.33. $b^*$=−5.65.

(iii) Deformation Index (DI)=5.7.

The polyester film was suitable for use as a base for an image-receiving film for a peel-apart system for instant photography.

EXAMPLE 2

The procedure of Example 1 was repeated except that the opaque first layer comprised 8% by weight of carbon black, and the white second layer comprised 60 ppm of a blue dye and 5 ppm of a magenta dye, but did not contain any titanium dioxide. Final film thickness was 100 μm. The opaque first layer was 20 μm thick, and the white second layer was 80 μm thick.

The polyester film was subjected to the test procedures described herein and exhibited the following properties:

(i) Transmission Optical Density (TOD)=6.0.

(ii) $L^*$=86.8. $a^*$=0.18. $b^*$=−6.14.

The polyester film was also suitable for use as a base for an image-receiving film for a peel-apart system for instant photography.

EXAMPLE 3

The procedure of Example 1 was repeated except that the opaque first layer additionally comprised 5.4% by weight of barium sulphate.

The polyester film was subjected to the test procedures described herein and exhibited the following properties:

(i) Transmission Optical Density (TOD)=5.4.

(ii) $L^*$=95.4. $a^*$=1.33. $b^*$=−5.65.

The polyester film was also suitable for use as a base for an image-receiving film for a peel-apart system for instant photography.

EXAMPLE 4

This is a Comparative Example not according to the invention. A polyethylene terephthalate monofilm comprising 18% by weight, relative to the weight of polyethylene terephthalate, of barium sulphate was produced according to the general film making procedures described in Example 1. The final film thickness was 100 μm.

The polyester film was subjected to the test procedures described herein and exhibited the following properties:

(i) Transmission Optical Density (TOD)=1.05.

(ii) $L^*$=96.9. $a^*$=0.28. $b^*$=−1.08.

The polyester film was unsuitable for use as a base for an image-receiving film for a peel-apart system for instant photography, having an insufficient optical density.

What is claimed is:

1. A method of producing a polyester film by coextrusion which comprises coextruding an opaque polyester first layer having an optical density greater than 2.0 and a white polyester second layer.

2. The method of claim 1 wherein the first layer comprises in the range from 0.05% to 10% by weight of opacifying agent, based on the weight of the first layer polyester.

3. The method of claim 2 wherein the opacifying agent comprises carbon black.

4. The method of claim 1 wherein the opacifying agent has a BET surface area in the range from 20 to 300 $m^2gm^{-1}$.

5. The method of claim 1 wherein the second layer comprises in the range from 5% to 60% by weight of a whitening agent, based on the weight of the second layer polyester.

6. The method of claim 1 wherein the film has a deformation index (D) of greater than 2.5%.

7. The method of claim 1 wherein the film has an optical density in the range from 3.0 to 10.

* * * * *